(No Model.)
M. J. HAMMERS & C. R. CLARK.
T-SQUARE.
No. 557,804. Patented Apr. 7, 1896.
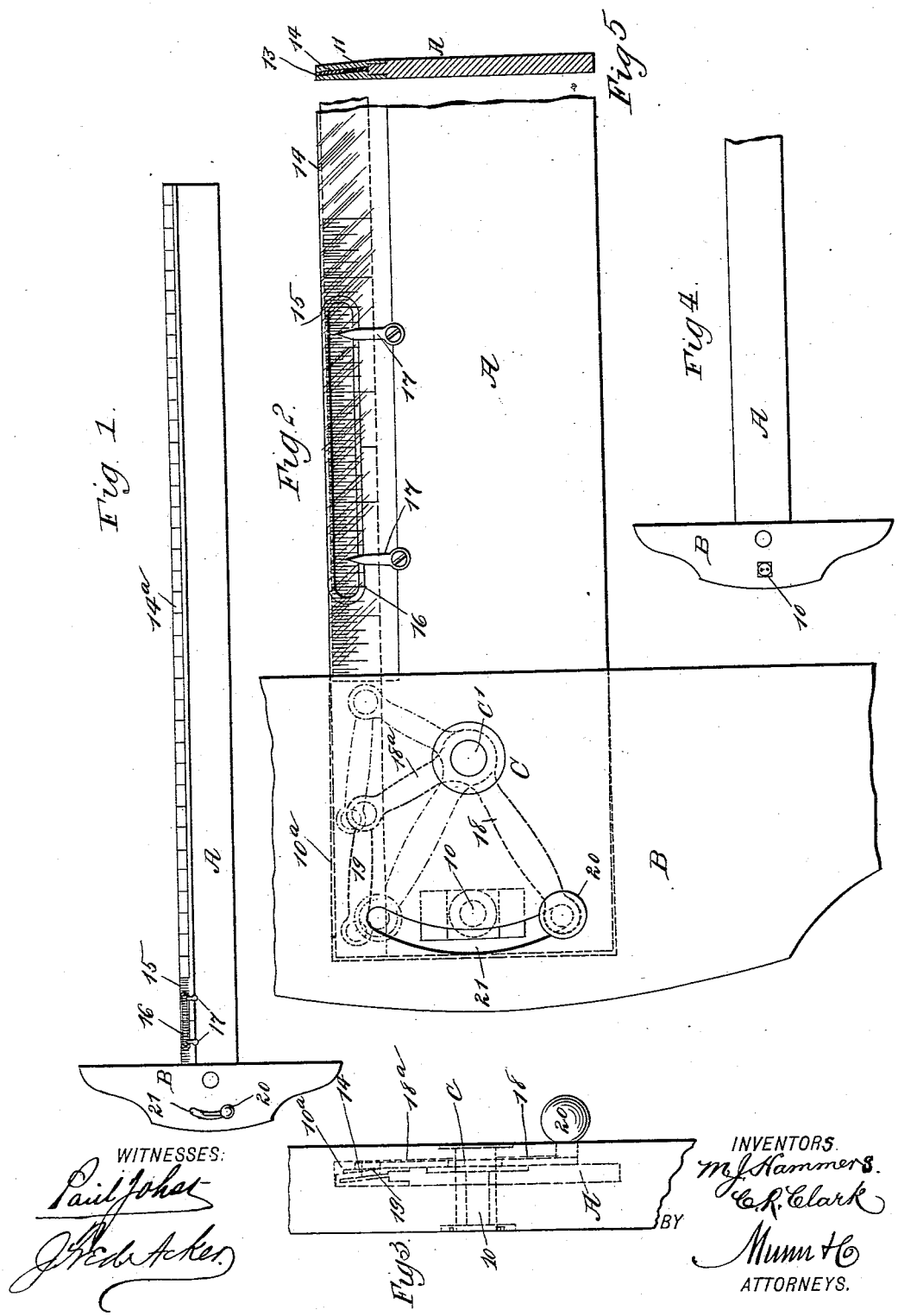
WITNESSES:
INVENTORS
M. J. Hammers
C. R. Clark
BY
Munn & Co
ATTORNEYS.

UNITED STATES PATENT OFFICE.

MORGAN J. HAMMERS AND CHARLES RICHARD CLARK, OF CHAMPAIGN, ILLINOIS.

T-SQUARE.

SPECIFICATION forming part of Letters Patent No. 557,804, dated April 7, 1896.

Application filed July 31, 1895. Serial No. 557,745. (No model.)

*To all whom it may concern:*

Be it known that we, MORGAN J. HAMMERS and CHARLES RICHARD CLARK, of Champaign, in the county of Champaign and State of Illinois, have invented a new and useful Improvement in T-Squares, of which the following is a full, clear, and exact description.

Our invention relates to an improvement in T-squares, and the object of the invention is to provide a tool which will be more satisfactory than that ordinarily employed in locating points and taking distances, and to provide for dispensing with the ordinary ruling and measuring separately with a T-square and scale to accomplish such a result; and a further object of the invention is to provide a scale adjustably placed in the arm of the square, so that any given distance can be laid off, beginning at any point on the paper.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the T-square in its entirety. Fig. 2 is an enlarged view of a portion of the head and blade of the square. Fig. 3 is an edge view of the longitudinal outer portion of the square-head or that portion containing the shifting mechanism for the scale. Fig. 4 is a bottom plan view of the improved T-square, and Fig. 5 is a cross-section through the blade thereof.

In carrying out the invention the square consists of the ordinary blade A and head B, and the two members of the square are connected together by a bolt or screw 10, which does not extend through to the upper face of the head, and the blade of the square is introduced into a suitable socket $10^a$ in the said head, and this socket is of a depth much greater than the thickness of the blade it receives, as shown in Fig. 3.

At the working side of the blade of the square an edge 11 of a transparent material is secured thereto in any suitable or approved manner, and this attached transparent edge is made sufficiently thick to enable a longitudinal chamber to be made therein, and a strip 14, of steel or its equivalent, is introduced into the said chamber of the aforesaid transparent strip, and is made also to extend into the chamber $10^a$ in the head. The strip 14 is provided with a scale $14^a$, which is marked off in inches simply for a greater portion of its length; but at the inner end of that portion of the strip which is adjacent to the head of the square a scale 15 in the fractions of an inch is introduced, and an elongated opening 16 is made in the transparent edge 13 over the fractional scale, as shown best in Fig. 2, exposing the same, in order that the draftsman may use dividers with this portion of the scale.

The scale is movable endwise in its transparent sheath, and at each side of the center of the elongated opening 16 a pointer 17 is secured to the upper face of the arm and extends over a side edge of the aforesaid opening, as is also best shown in Fig. 2.

The scale is manipulated, preferably, through the medium of an angled lever C, fulcrumed upon a pivot-point C' in the chamber $10^a$ of the head. One member of this lever is preferably made longer than the other, and said member is designated as 18 in the drawings, and the shorter member $18^a$ is extended in direction of that portion of the slide introduced into the head, being connected therewith in a pivotal manner by means of a link 19, while a knob 20 or its equivalent is formed at the outer extremity of the longer member 18 of the lever, extending outward through a curved slot 21 made in the upper face of the head of the square, whereby upon moving the knob 20 along the slot 21 the scale may be shifted endwise an inch or more.

In the operation of the square if, for example, it is desired to measure off twenty-four and a quarter inches, the square is placed upon the paper and the paper marked at the division of the scale indicating twenty-four inches. The knob 20 is then manipulated to carry the scale outward a distance which will cause a quarter of an inch to register at one of the pointers 17, whereupon the desired measurement is obtained with the use of the additional scale and without moving the square.

The two pointers are employed in order that any portion of the scale exposed at the opening 16 may be brought to a registry with one or the other of the pointers.

When the square is constructed as above set forth, considerable economy is obtained in its manufacture, since it is necessary to divide the indicated inches in fractions a short distance only on the scale.

Having thus described our invention, we claim as new and desire to secure by Letters Patent—

1. A T-square provided with a transparent pocketed graduated working edge, a sliding scale in said pocket, and an operating-handle mounted on the head of the square and connected with the adjacent end of the scale to operate it, substantially as described.

2. A T-square provided with a transparent graduated working edge, and a scale sliding within said edge, the transparent portion having a longitudinal opening to expose the scale and admit the introduction of dividers thereto, substantially as described.

3. A T-square having a transparent working edge, and a scale having sliding movement in the said edge, the edge being provided with an opening exposing a portion of the scale, and pointers extending across the said opening, as and for the purpose specified.

4. A T-square the blade of which is provided with a transparent working edge, a scale having sliding movement in the said transparent edge, provided with graduations in fractions for a portion only of its length, the blade having an opening exposing the fractional portion of the scale, and means, substantially as described, for moving the scale in its transparent sheath, as and for the purpose specified.

5. A T-square having a transparent working edge, a scale mounted to slide in the said transparent edge, having a major portion of its length divided into inches and a fraction of its length into parts of inches, pointers extending over the fractional portion of the scale, a shifting-lever located in the head of the square and connected with the scale, and means, substantially as described, for operating the said lever, as and for the purpose set forth.

6. A T-square having a transparent working edge, a scale mounted to slide in the said transparent edge, having a major portion of its length divided into inches, and a fraction of its length into parts of inches, pointers extending over the fractional portion of the scale, and a shifting-lever located within the head of the square, the said lever being of angular construction, one of its members having a link connection with the movable scale and the other member being made to extend outward through a curved opening made in the said head, as and for the purpose specified.

MORGAN J. HAMMERS.
CHARLES RICHARD CLARK.

Witnesses:
H. F. CUMBERLAND,
EVLAN CLARK.